United States Patent
Mukherjee et al.

(10) Patent No.: US 7,754,804 B2
(45) Date of Patent: Jul. 13, 2010

(54) AQUEOUS DISPERSIONS OF HYDROSOLUBLE POLYMERISATES OF ETHYLENICALLY UNSATURATED ANIONIC MONOMERS, METHOD FOR THE PRODUCTION AND USE THEREOF

(75) Inventors: Pulakesh Mukherjee, Mannheim (DE); Marc Leduc, Speyer (DE); Peter Claassen, Ludwigshafen (DE); Werner Gauweiler, Lustadt (DE); Roland Nowack, Birkenheide (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 856 days.

(21) Appl. No.: 10/565,772

(22) PCT Filed: Jul. 17, 2004

(86) PCT No.: PCT/EP2004/008011

§ 371 (c)(1),
(2), (4) Date: Jan. 9, 2007

(87) PCT Pub. No.: WO2005/012378

PCT Pub. Date: Feb. 10, 2005

(65) Prior Publication Data

US 2007/0117903 A1    May 24, 2007

(30) Foreign Application Priority Data

Jul. 25, 2003  (DE) ................. 103 34 262
Aug. 21, 2003  (DE) ................. 103 38 828

(51) Int. Cl.
C08F 2/16 (2006.01)

(52) U.S. Cl. .................. 524/460; 524/47; 524/48; 524/457; 524/458; 524/500; 524/504; 524/505; 524/522

(58) Field of Classification Search ............ 524/457, 524/458, 460, 47, 48, 500, 504, 505, 522
See application file for complete search history.

(56) References Cited

U.S. PATENT DOCUMENTS

| 3,281,377 A | * | 10/1966 | Michael Lederer et al. | 521/134 |
| 4,380,600 A | | 4/1983 | Hosoda et al. | |
| 5,227,446 A | | 7/1993 | Denzinger et al. | |
| 5,605,970 A | | 2/1997 | Selvarajan | |
| 5,840,804 A | * | 11/1998 | Carl et al. | 524/555 |

FOREIGN PATENT DOCUMENTS

| EP | 0 183 466 | 6/1986 |
| EP | 0 984 990 | 3/2003 |
| WO | 93/21244 | 10/1993 |
| WO | 97/34933 | 9/1997 |
| WO | 03/046024 | 6/2003 |

\* cited by examiner

Primary Examiner—David Wu
Assistant Examiner—Marie Reddick
(74) Attorney, Agent, or Firm—Oblon, Spivak, McClelland, Maier & Neustadt, L.L.P.

(57) ABSTRACT

An aqueous dispersion of water-soluble polymers obtained by free radical polymerization of ethylenically unsaturated anionic monomers in an aqueous medium in the presence of a stabilizer, wherein the stabilizer comprises: (a) at least one water-soluble polymer selected from the group consisting of a graft polymer of vinyl acetate and/or vinyl propionate on polyethylene glycol, a polyethylene glycol blocked at one or both terminal groups with an alkyl, a carboxyl or an amino group, and a copolymer of alkyl polyalkylene glycol methacrylate and methacrylic acid; and (b) at least one water-soluble polymer selected from the group consisting of a hydrolyzed copolymer of vinyl alkyl ether and maleic anhydride in the form of free carboxyl groups or in the form of salts at least partially neutralized with one or more alkali metal hydroxides or one or more ammonium bases, a cationically modified potato starch, an anionically modified potato starch, a degraded potato starch and maltodextrin.

15 Claims, No Drawings

AQUEOUS DISPERSIONS OF HYDROSOLUBLE POLYMERISATES OF ETHYLENICALLY UNSATURATED ANIONIC MONOMERS, METHOD FOR THE PRODUCTION AND USE THEREOF

The present invention relates to aqueous dispersions of water-soluble polymers of ethylenically unsaturated anionic monomers by free radical polymerization of the monomers in an aqueous medium in the presence of at least one stabilizer, their preparation and their use as thickeners for aqueous systems.

U.S. Pat. No. 4,380,600 discloses a process for the preparation of aqueous dispersions of water-soluble polymers, water-soluble monomers which form water-soluble polymers being polymerized in an aqueous solution of at least one other polymer, such as polyethylene glycol, polyvinylpyrrolidone or starch, in the presence of free radical initiators. The aqueous solution of the other polymer, which is initially taken in the polymerization, contains from 3 to 150 parts by weight of the water-soluble polymer. The amount of the water-soluble monomers used in the polymerization, such as acrylic acid, sodium acrylate or acrylamide, is from 10 to 150 parts by weight, based on 100 parts by weight of water. In order to increase the stability of the resulting aqueous dispersions of water-soluble polymers, the polymerization can additionally be carried out in the presence of surfactants and, if required, also in the presence of water-soluble inorganic salts, such as sodium chloride or potassium sulfate.

EP-A-0 183 466 discloses a process for the preparation of aqueous dispersions of water-soluble polymers, the water-soluble monomers being polymerized in an aqueous solution which contains a salt, e.g. ammonium sulfate, and a polymeric dispersant, e.g. a polyol, polyethylene glycol and/or polypropylene glycol having a molecular weight of up to 600, or a cationic or anionic polyelectrolyte. With the exception of homopolymers of specific cationic monomers, homopolymers of ionic monomers cannot be prepared by this process, cf. EP-A-0 183 466, page 5, lines 2 to 6. As shown in the examples, however, copolymers of acrylamide and acrylic acid can be prepared.

U.S. Pat. No. 5,605,970 discloses a process for the preparation of aqueous dispersions of high molecular weight anionic polymers. In this process, an aqueous solution of acrylic acid is polymerized with addition of from 2 to 20% by weight of ammonium sulfate, glycerol, ethylene glycol and a low molecular weight terpolymer of 66 mol % of acrylic acid, 22 mol % of sodium acrylate and 12 mol % of ethylhexyl acrylate in the presence of from 3 to 14 mol % of ethylhexyl acrylate and a polymerization initiator at a pH below 4.5 with formation of an aqueous dispersion of a high molecular weight terpolymer of acrylic acid, sodium acrylate and ethylhexyl acrylate. The terpolymer is isolated after cooling. In the known process, it is essential to use an inorganic salt and a hydrophobic monomer, such as ethylhexyl acrylate. However, the properties of the anionic polymers are modified in an undesirable manner as a result.

Moreover, aqueous dispersions of water-soluble polymers of N-vinylcarboxamides are known. They are prepared according to WO-A-03/046024 by polymerizing N-vinylcarboxamides in an aqueous medium in the presence of polymeric stabilizers, such as polyethylene glycol, polypropylene glycol, polyvinyl acetate, polyvinyl alcohol, polyvinylimidazole or polydiallyldimethylammonium chloride are obtained by polymerizing N-vinylcarboxamides in aqueous solutions which have high concentrations of inorganic salts, cf. the examples in EP-B-0 984 990.

WO-A-97/34933 discloses aqueous dispersions of high molecular weight nonionic or anionic polymers which are prepared by polymerization of the monomers in a saturated aqueous salt solution with addition of an anionic, water-soluble polymer stabilizer. Preferably used monomers are acrylamide and/or acrylic acid. Suitable polymer stabilizers are, for example, anionically charged water-soluble polymers having a molar mass of from 100 000 to 5 million. They are used in amounts of, for example, from 0.1 to 5 percent by weight, based on the total dispersion. During the polymerization, a pH of from 2 to 5 must be maintained.

Aqueous dispersions of water-soluble anionic polymers which contain inorganic salts in dissolved form cannot, for example, be used as thickeners for aqueous systems, such as paper coating slips, because the inorganic salts greatly reduce the viscosity of the system to be thickened. This property is known as the salt poisoning effect.

It is an object of the present invention to provide aqueous dispersions of water-soluble anionic polymers in whose preparation no inorganic salts having a stabilizing effect need be used, so that the dispersions formed are virtually free of such salts.

We have found that this object is achieved, according to the invention, by aqueous dispersions of water-soluble polymers of ethylenically unsaturated anionic monomers by free radical polymerization of the monomers in an aqueous medium in the presence of at least one stabilizer, if the polymerization is carried out in the presence of at least one water-soluble polymer from the group consisting of (a) graft polymers of vinyl acetate and/or vinyl propionate on polyethylene glycols, polyethylene glycols blocked at one or both terminal groups with alkyl, carboxyl or amino groups, copolymers of alkyl polyalkylene glycol acrylates or alkyl polyalkylene glycol methacrylates and acrylic acid and/or methacrylic acid, polyalkylene glycols, polyalkylene glycols blocked at one or both terminal groups with alkyl, carboxyl or amino groups,
and
(b) hydrolyzed copolymers of vinyl alkyl ethers and maleic anhydride in the form of the free carboxyl groups and in the form of the salts at least partly neutralized with alkali metal hydroxides or ammonium bases, and/or of water-soluble starch from the group consisting of cationically modified potato starch, anionically modified potato starch, degraded potato starch and maltodextrin,
as a stabilizer.

Suitable anionic monomers are, for example, monoethylenically unsaturated $C_3$- to $C_5$-carboxylic acids, such as acrylic acid, methacrylic acid, ethacrylic acid, crotonic acid, maleic acid or fumaric acid, vinylsulfonic acid, styrenesulfonic acid, acrylamidomethylpropanesulfonic acid, vinylphosphonic acid and/or the alkali metal or ammonium salts thereof. The preferably used anionic monomers include acrylic acid, methacrylic acid, maleic acid and acrylamidomethylpropanesulfonic acid. Aqueous dispersions of polymers based on acrylic acid are particularly preferred. The anionic monomers can be polymerized either alone to give homopolymers or as a mixture with one another to give copolymers. Examples of these are the homopolymers of acrylic acid or copolymers of acrylic acid with methacrylic acid and/or maleic acid.

The polymerization of the anionic monomers can, however, also be carried out in the presence of other ethylenically unsaturated monomers. These monomers may be nonionic or may carry a cationic charge. Examples of such comonomers are acrylamide, methacrylamide, acrylic esters of monohydric alcohols of 1 to 4 carbon atoms, methacrylic esters of monohydric alcohols of 1 or 2 carbon atoms, vinyl acetate, vinyl propionate, dialkylaminoethyl (meth)acrylates, dialkylaminopropyl (meth)acrylates, diallyldimethylammonium chloride, vinylimidazole and quaternized vinylimidazole. Basic monomers, such as dimethylaminoethyl acrylate or dimethylaminoethyl methacrylate, can be used both in the form of the free bases and in partly or completely neutralized form in the polymerization. The comonomers are used in the preparation of the anionic polymers, for example, in amounts such that the polymers formed are water-soluble and have an anionic charge. The amount of nonionic and/or cationic comonomers is, for example, from 0 to 99, preferably from 5 to 75, % by weight, based on the total amount of monomers used in the polymerization.

Preferred copolymers are, for example, copolymers of from 25 to 90% by weight of acrylic acid and from 75 to 10% by weight of acrylamide.

The polymerization may additionally be carried out in the presence of at least one crosslinking agent. Copolymers having a higher molar mass than on polymerization of the anionic monomers in the absence of a crosslinking agent are then obtained. Crosslinked copolymers have a high water absorptivity. They can be used, for example, as thickeners for aqueous systems, such as paper coating slips. Crosslinking agents which may be used are all compounds which have at least two ethylenically unsaturated double bonds in the molecule. Such compounds are used, for example, in the preparation of crosslinked polyacrylic acids, such as superabsorbent polymers, cf. EP-A-0 858 478. Examples of crosslinking agents are triallylamine, pentaerythrityl triallyl ether, methylenebisacrylamide, N,N'-divinylethyleneurea, dihydric alcohols of 2 to 4 carbon atoms which are completely esterified with acrylic acid or methacrylic acid, such as ethylene glycol dimethacrylate, ethylene glycol diacrylate, butanediol dimethacrylate, butanediol diacrylate, diacrylates and dimethacrylates of polyethylene glycols having molecular weights of from 300 to 600, ethoxylated trimethylenepropane triacrylates or ethoxylated trimethylenepropane trimethacrylates, 2,2-bis(hydroxymethyl)butanol trimethacrylate, pentaerythrityl triacrylate, pentaerythrityl tetraacrylate and triallylmethylammonium chloride. If crosslinking agents are used in the preparation of the anionic dispersions, the amounts of crosslinking agent used in each case are, for example, from 0.0005 to 5.0, preferably from 0.001 to 1.0, % by weight, based on the total amount of monomers used in the polymerization.

Usually, initiators which form free radicals under the reaction conditions are used in the polymerization. Suitable polymerization initiators are, for example, peroxides, hydroperoxides, hydrogen peroxide, redox catalysts and azo compounds, such as 2,2-azobis(N,N-dimethyleneisobutyramidine) dihydrochloride, 2,2-azobis(4-methoxy-2,4-dimethylvaleronitrile), 2,2-azobis(2,4-dimethylvaleronitrile) and 2,2-azobis-(2-amidinopropane) dihydrochloride. The initiators are used in the amounts customary in the polymerization. Preferably used polymerization initiators are azo initiators. However, the polymerization can also be initiated with the aid of high-energy beams, such as electron beams, or by irradiation with UV light.

The aqueous dispersions of the anionic polymers have a polymer concentration of, for example, from 1 to 60, preferably from 10 to 50, preferably from 10 to 40, particularly preferably from 10 to 30 and in particular from 15 to 25, % by weight. According to the invention, they comprise at least two different groups of the abovementioned polymers (a) and (b) for stabilizing the anionic polymers formed in the polymerization. The amount of stabilizers (a) and (b) in the aqueous dispersion is, for example, from 1 to 30, preferably from 4 to 30, % by weight, preferably from 5 to 25% by weight and in particular from 5 to 20% by weight. The aqueous dispersions have, for example, viscosities of from 200 to 20 000, preferably from 200 to 12 000, preferably from 200 to 6000, mPa·s (as measured in a Brookfield viscometer at 20° C., spindle 6, 100 rpm) at pH of 4.5.

Uncrosslinked anionic polymers of the novel aqueous dispersions have as a rule molecular weights of from 10 000 to 15 000 000, preferably from 50 000 to 10 000 000, g/mol, measured by GPC (gel permeation chromatography, measured against a polyacrylic acid standard) and FFF (field flow fractionation). For crosslinked anionic polymers, the molecular weight cannot be determined in this manner. The molecular weight is dependent on the amount of crosslinking agent used and on the degree of branching of the polymer and can accordingly also be outside the stated ranges for uncrosslinked polymers.

Preferred stabilizers of group (a) are water-soluble graft polymers of vinyl acetate on polyethylene glycols, polyethylene glycols blocked at one or both terminal groups with alkyl, carboxyl or amino groups and/or copolymers of alkyl polyalkylene glycol methacrylates and methacrylic acid. Polyalkylene glycols are described, for example, in WO-A-03/046024, page 4, line 37 to page 8, line 9. For example, from 10 to 1000, preferably from 30 to 300, parts by weight of vinyl acetate are grafted onto 100 parts by weight of the grafting base. Polyethylene glycol having a molecular weight $M_n$ of from 1000 to 100 000 is preferably used as the grafting base.

Preferred stabilizers of group (a) are moreover copolymers of alkyl polyalkylene glycol acrylates or alkyl polyalkylene glycol methacrylates and acrylic acid and/or methacrylic acid. Such compounds are known, for example, as dispersants for cement. They are prepared by first esterifying adducts of ethylene oxide and/or propylene oxide with, for example, $C_1$- to $C_{18}$-alcohols with acrylic acid and/or methacrylic acid and then copolymerizing these esters with acrylic acid and/or methacrylic acid. The copolymers usually used contain, for example, from 5 to 60, preferably from 10 to 35, % by weight of polymerized units of alkyl polyalkylene glycol methacrylates and from 95 to 40, preferably from 90 to 65, % by weight of polymerized units of (meth)acrylic acid. They generally have molar masses $M_w$ of from 2000 to 50 000, preferably from 5000 to 20 000. These copolymers can be used in the form of the free acid groups or in completely or partly neutralized form in the preparation of the novel dispersions. The carboxyl groups of the copolymers are preferably neutralized with sodium hydroxide solution or ammonia.

Further suitable water-soluble polymers (a) are polyalkylene glycols having molar masses $M_n$ of from 100 to 100 000, preferably of from 300 to 80 000, particularly preferably of from 600 to 50 000 and in particular of from 1000 to 50 000, polyalkylene glycols blocked at one or both terminal groups with alkyl, carboxyl or amino groups and having molar masses $M_n$ of from 100 to 100 000, preferably of from 300 to 80 000, particularly preferably of from 600 to 50 000 and in particular of from 1000 to 50 000. Water-soluble polymers are described, for example, in the above-cited WO-A-03/046024, page 4, line 37 to page 8, line 9. Preferred polyalkylene glycols are polyethylene glycol, polypropylene glycol and block copolymers of ethylene oxide and propylene oxide. The block copolymers may comprise ethylene oxide and propylene oxide in any desired amounts and incorporated in the form of polymerized units in any desired sequence. The terminal OH groups of the polyalkylene glycols can, if required, be blocked with a methyl group.

The water-soluble polymers of group (a) are used, for example, in amounts of from 2 to 15, preferably from 5 to 12, % by weight, based on the total dispersion, in the preparation of the dispersions.

Water-soluble polymers of group (b) which are used are preferably hydrolyzed copolymers of vinyl alkyl ethers and maleic anhydride in the form of the free carboxyl groups and in the form of the salts at least partly neutralized with alkali metal hydroxides or ammonium bases. The alkyl group of the vinyl alkyl ethers may have, for example, 1 to 4 carbon atoms. The copolymers are obtainable by copolymerizing vinyl alkyl ethers with maleic anhydride and then hydrolyzing the anhydride groups to carboxyl groups and, if required, partly or completely neutralizing the carboxyl groups. Particularly preferred water-soluble polymers of group (b) are hydrolyzed copolymers of vinyl methyl ether and maleic anhydride in the form of the free carboxyl groups or in the form of the salts at least partly neutralized with sodium hydroxide solution, potassium hydroxide solution or ammonia.

Further suitable water-soluble polymers of group (b) are water-soluble starches from the group consisting of cationically modified potato starch, anionically modified potato starch, degraded potato starch and maltodextrin. Examples of cationically modified potato starches are the commercial products Amylofax 15 and Perlbond 970. A suitable anionically modified potato starch is Perfectamyl A 4692. Here, the modification substantially comprises carboxylation of potato starch. C*Pur 1906 is an example of an enzymatically degraded potato starch and maltodextrin C 01915 is an example of a hydrolytically degraded potato starch. Of said starches, maltodextrin is preferably used.

The novel aqueous dispersions comprise the polymers of group (b), for example, in amounts of from 2 to 15, preferably from 5 to 12, % by weight. The ratio of water-soluble polymers of group (a) to polymers of group (b) in the novel dispersions is, for example, from 1:5 to 5:1, preferably from 1:2 to 2:1.

The aqueous dispersions of the anionic polymers preferably comprise, as a stabilizer, a combination of
 (a) at least one graft polymer of vinyl acetate on polyethylene glycols having a molecular weight $M_n$ of from 1000 to 100 000
 and
 (b) at least one hydrolyzed copolymer of vinyl methyl ether and maleic anhydride in the form of the free carboxyl groups and in the form of the salts at least partly neutralized with sodium hydroxide solution, potassium hydroxide solution or ammonia.

In a further preferred embodiment of the invention, the following combination of water-soluble polymers is used:
 (a) copolymers of alkyl polyalkylene glycol acrylates or alkyl polyalkylene glycol methacrylates and acrylic acid and/or methacrylic acid and
 (b) at least one hydrolyzed copolymer of vinyl methyl ether and maleic anhydride in the form of the free carboxyl groups and in the form of the salts at least partly neutralized with sodium hydroxide solution, potassium hydroxide solution or ammonia.

Further combinations of stabilizers for the preparation of the aqueous dispersions of anionic polymers are, for example, mixtures of
 (a) polypropylene glycols, polyethylene glycols and/or block copolymers of ethylene oxide and propylene oxide having molecular weights $M_n$ of from 300 to 50 000 and/or polypropylene glycols, polyethylene glycols and/or block copolymers of ethylene oxide and propylene oxide having a molecular weight $M_n$ of from 300 to 50 000 and blocked at one or both terminal groups with $C_1$- to $C_4$-alkyl groups
 and
 (b) maltodextrin.

The present invention furthermore relates to a process for the preparation of aqueous dispersions of water-soluble polymers of ethylenically unsaturated anionic monomers by free radical polymerization of the monomers in an aqueous medium in the presence of at least one stabilizer, the polymerization being carried out in the presence of at least one water-soluble polymer from the groups consisting of
 (a) graft polymers of vinyl acetate and/or vinyl propionate on polyethylene glycols, polyethylene glycols blocked at one or both terminal groups with alkyl, carboxyl or amino groups, copolymers of alkyl polyalkylene glycol acrylates or alkyl polyalkylene glycol methacrylates and acrylic acid and/or methacrylic acid, polyalkylene glycols, polyalkylene glycols blocked at one or both terminal groups with alkyl, carboxyl or amino groups,
 and
 (b) hydrolyzed copolymers of vinyl alkyl ethers and maleic anhydride in the form of the free carboxyl groups and in the form of the salts at least partly neutralized with alkali metal hydroxides or ammonium bases, and/or of water-soluble starch from the group consisting of cationically modified potato starch, anionically modified potato starch, degraded potato starch and maltodextrin, as a stabilizer at a pH of from 1 to 12, preferably from 2 to 5.

Stable aqueous dispersions of anionic polymers having a particle size of from 0.1 to 200 μm, preferably from 0.5 to 70 μm, are obtained. At a pH below 6, dispersions having a content of from about 5 to 35% by weight of anionic polymers have a relatively low viscosity. However, if they are diluted to a content of 2% by weight of anionic polymers, the viscosity of the mixture increases sharply. It is noteworthy that the viscosity of, for example, 2% strength by weight aqueous solutions of the novel aqueous dispersions change only slightly in the pH range from 7 to 13. For example, a 2% strength by weight aqueous solution of an aqueous polyacrylic acid dispersion prepared according to the invention has the following viscosity curve:
pH 7: 25 000 mPa·s
pH 8: 26 500 mPa·s
pH 9: 27 000 mPa·s
pH 10: 27 000 mPa·s
pH 12.3: 28 000 mPa·s
pH 13: 27 500 mPa·s Uncrosslinked anionic polymers dissolve in water while the anionic polymers prepared in the presence of crosslinking agents swell to a considerable extent and also greatly increase the viscosity of the aqueous medium. For example, 2% strength by weight aqueous solutions of the anionic polymers at a pH of 7 have a viscosity of from 1000 to 70 000 mPa·s (measured in a Brookfield viscometer, spindle 6, at 20° C.).

The aqueous dispersions of the anionic polymers are used as thickeners for aqueous systems, for example as an additive to paper coating slips, as thickeners for pigment print pastes and as an additive to water-based surface coatings, such as masonry coatings. In addition, uses in pharmaceutical products (creams, transdermal systems, ointments, capsules, etc.), in personal care products (hand soap, toothpaste, oral hygiene products, shower gels, lotions, shampoos, etc.), in alkaline batteries and in air care products (for example air fresheners) are possible. They are also used in cosmetics, for example in cosmetic hair formulations, such as conditioners or hair setting compositions, or as thickeners for cosmetic formulations and for the surface treatment of leather. Furthermore, an application in the coating sector, for example as a tablet coating, is possible.

The novel aqueous dispersions are used, for example as thickeners. The thickeners known from the prior art give rise to certain problems which could be eliminated using the novel dispersions.

Thickener or rheology modifiers based on conventional homopolyacrylates are obtained in the form of solid, preferably as a powder, owing to the preparation process used (as a rule, precipitation polymerization is carried out). When they are used as thickeners, there is in principle therefore the problem of converting this solid back into a solution. The particles must first be wet with solvent, preferably water having a pH of <7, particularly preferably of pH<4, in order subsequently to convert them into a solution under the action of high shear forces or alternatively by means of long stirring times. As a rule, in the preparation of viscous liquid formulations, thickeners are dissolved in an acidic medium at the beginning of the preparation process and then the further formulation components are incorporated into the formulation. Incorporation of thickeners based on homopolyacrylates according to the prior art in alkaline media is not possible. The medium thickens immediately, the pulverulent thickener forms only very sparingly soluble gel particles, and it is not possible to establish a defined viscosity in this manner.

On introduction of, in particular, alkaline formulation ingredients into the solution of the thickener, the viscosity of the formulation increases, and, if appropriate, a base (for example NaOH, KOH, triethanolamine, organic or inorganic amines, etc.) is added to the formulation in order to display the thickening effect of the polyacrylate.

As a rule, attempts are made to introduce alkaline components as far as possible as the last components in the formulation in order to be able to handle a low-viscosity product as long as possible. Alternatively, the viscosity can also be established by adding a concentrated solution of a thickener dissolved separately beforehand, limits being imposed here owing to the solution properties of the thickener and the viscosity of this thickener premix. Another disadvantage here is that additional plant components (e.g. storage/metering tank) are necessary. A general problem is that the final viscosity of the formulation may vary.

By using the novel aqueous polymer dispersions as thickeners in the preparation of viscous liquid formulations, a process latitude not obtained to date is achieved. The polymer dispersions can be added in the total pH range, i.e. independently of the pH of the formulation at the time of the addition (cf. use examples 17-20 as thickener), the final viscosity being constant with the use of the same ingredients. It is known that the use of different bases leads to different viscosities.

The novel aqueous dispersions can be added in the total pH range to a system to be thickened.

A novel aqueous polyacrylate dispersion can be dissolved equally well in an acidic as in an alkaline medium, advantageously under the action of only low shear forces.

Particularly advantageous is the possibility of being able to incorporate the novel polymer dispersion into an alkaline formulation. Thickeners based on homopoly-acrylates according to the prior art can be used only to a very limited extent, particularly in the latter case only under the action of very high shear forces and/or long process times (duration of stirring). Owing to the good solubility of the novel polymer dispersions, only low shear forces need be applied i.e. stirrers such as anchor stirrers, paddle stirrers or the like can be used. Complicated and expensive apparatuses employing high shear forces (e.g. rotor-stator mixing systems) are therefore not necessary. As a result of this, the energy input into the formulation is substantially reduced. Mechanical degradation of the polymer chains and hence a partial reduction of viscosity are thus avoided.

Furthermore, the use of the novel polymer dispersions in the last process step in the preparation of a formulation enables the product viscosity to be established exactly. This furthermore has the advantage that the viscosity is low up to this step and no high shear forces act on the formulation. Consequently, the incorporation of solid, including mechanically unstable, formulation components is additionally promoted.

Since a thickener prepared using novel aqueous dispersions can also be incorporated without problems into an alkaline product, a subsequent correction of the product viscosity is also possible.

The novel polymer dispersions furthermore have the advantageous properties that, owing to their low viscosity, they are excellently handleable and meterable and that they dissolve very rapidly in the medium to be thickened, with the result that process times can be reduced.

In principle, the novel aqueous dispersions are suitable for all types of products in which it is important to establish a defined rheology. Without intending any limitation to the following applications, the following may be mentioned by way of example: detergents and cleaning agents, styling gels, shampoos, hair coloring compositions and dyes.

A further special application form of the novel aqueous dispersions of the anionic polymer is the production of printed flexible substrates and in particular printed textile, also referred to below as textile printing process.

For carrying out the textile printing process, for example, it is possible to adopt a procedure in which at least one novel aqueous dispersion is processed to give a pigment print paste, also referred to below as novel pigment print paste, and textile substrates are then printed by methods known per se.

Advantageously, novel pigment print pastes are prepared by mixing at least one novel aqueous dispersion with assistants customary in the printing process and at least one pigment. The depth of color is advantageously established by tailoring the ratio of pigment to aqueous dispersion used according to the invention.

Pigment is added to the novel pigment print pastes preferably in the form of pigment formulations. Pigment formulations usually comprise from 20 to 60% by weight of pigment and furthermore water and one or more surface-active compounds, for example one or more emulsifiers, polyalkoxylated C10-C30-alkanols being mentioned by way of example.

In the context of the present invention, pigments are to be understood as meaning virtually insoluble, dispersed finely divided, organic or inorganic colorants according to the definition in DIN 55944. At least one organic pigment and/or metal pigment is preferably chosen.

Examples of Selected Organic Pigments are

Monoazo pigments: C.I. Pigment Brown 25; C.I. Pigment Orange 5, 13, 36 and 67; C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251; C.I. Pigment Yellow 1, 3, 73, 74, 65, 97, 151 and 183;

Disazo pigments: C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 155, 174, 176 and 188;

Anthanthrone pigments: C.I. Pigment Red 168 (C.I. Vat Orange 3);
Anthraquinone pigments: C.I. Pigment Yellow 147 and 177; C.I. Pigment Violet 31;
Anthraquinone pigments: C.I. Pigment Yellow 147 and 177; C.I. Pigment Violet 31;
Anthrapyrimidine pigments: C.I. Pigment Yellow 108 (C.I. Vat Yellow 20);
Quinacridone pigments: C.I. Pigment Red 122, 202 and 206; C.I. Pigment Violet 19;
Quinophthalone pigments: C.I. Pigment Yellow 138;
Dioxazine pigments: C.I. Pigment Violet 23 and 37;
Flavanthrone pigments: C.I. Pigment Yellow 24 (C.I. Vat Yellow 1);
Indanthrone pigments: C.I. Pigment Blue 60 (C.I. Vat Blue 4) and 64 (C.I. Vat Blue 6);
Isoindoline pigments: C.I. Pigment Orange 69; C.I. Pigment Red 260; C.I. Pigment Yellow 139 and 185;
Isoindolinone pigments: C.I. Pigment Orange 61; C.I. Pigment Red 257 and 260; C.I. Pigment Yellow 109, 110, 173 and 185;
Isoviolanthrone pigments: C.I. Pigment Violet 31 (C.I. Vat Violet 1);
Metal complex pigments: C.I. Pigment Yellow 117, 150 and 153; C.I. Pigment Green 8;
Perinone pigments: C.I. Pigment Orange 43 (C.I. Vat Orange 7); C.I. Pigment Red 194 (C.I. Vat Red 15);
Perylene pigments: C.I. Pigment Black 31 and 32; C.I. Pigment Red 123, 149, 178, 179 (C.I. Vat Red 23), 190 (C.I. Vat Red 29) and 224; C.I. Pigment Violet 29;
Phthalocyanine pigments: C.I. Pigment Blue 15, 15:1, 15:2, 15:3, 15:4, 15:6 and 16; C.I. Pigment Green 7 and 36;
Pyranthrone pigments: C.I. Pigment Orange 51; C.I. Pigment Red 216 (C.I. Vat Orange 4);
Thioindigo pigments: C.I. Pigment Red 88 and 181 (C.I. Vat Red 1); C.I. Pigment Violet 38 (C.I. Vat Violet 3);
Triarylcarbonium pigments: C.I. Pigment Blue 1, 61 and 62; C.I. Pigment Green 1; C.I. Pigment Red 81, 81:1 and 169; C.I. Pigment Violet 1, 2, 3 and 27; C.I. Pigment Black 1 (aniline black);
C.I. Pigment Yellow 101 (aldazine yellow);
C.I. Pigment Brown 22.

Examples of particularly preferred pigments are: C.I. Pigment Yellow 138; C.I. Pigment Red 122, C.I. Pigment Violet 19, C.I. Pigment Blue 15:3 and 15:4; C.I. Pigment Black 7, C.I. Pigment Orange 5, 38 and 43 and C.I. Pigment Green 7.

Further suitable pigments are metallic pigments, for example gold bronze, silver bronze, iriodine pigments and glitter.

The mean diameter of pigments used according to the invention is usually from 20 nm to 1.5 µm, preferably from 300 to 500 nm.

Binders which may be used are all binders customary in textile printing, for example binders based on polyurethanes and preferably acrylate-based binders (acrylate binders). Acrylate-based binders are typically copolymers of (meth) acrylic acid with one or more C1-C10-alkyl (meth)acrylates and, if required, further comonomers, for example (meth) acrylonitrile and styrene, it being possible for the (meth) acrylic acid to be partially or completely neutralized with, for example, alkali metal hydroxide or ammonia.

In an embodiment of the present invention, binders, in particular acrylate-based binders, have a glass transition temperature Tg of at least 0° C., determined, for example, according to the Fox equation or determined by DSC (differential scanning calorimetry).

The ratio of pigment to binder may be chosen within wide limits. For example, it is possible to choose pigment and binder in a weight ratio of from 20:1 to 1:100. In a preferred embodiment of the present invention, the ratio of pigment to aqueous dispersion used according to the invention is established so that the weight ratio of pigment to solid fractions of aqueous dispersion used according to the invention is from 1:1 to 1:20.

It is of course also possible first to premix pigment and binder in a weight ratio of from 20:1 to 10:1 and to admix further binder only directly before printing.

Further conventional assistants for pigment print pastes in textile printing are disclosed in Ullmann, Handbuch der technischen Chemie und Verfahrenstechnik, cf. for example Ullmann's Encyclopedia of Industrial Chemistry, 5th edition, keyword: textile auxiliaries, vol. A26, page 286 et seq. and 296 et seq., Verlag Chemie, Weinheim, Deerfield/Florida, Basel; 1996, and in Textil-Hilfsmittel-Katalog, Konradin Verlag Robert Kohlhammer GmbH, D-70771 Leinfelden-Echterdingen. Thickeners, fixing agents, hand improvers, antifoams, rheology enhancers, acid donors and emulsifiers may be mentioned by way of example as conventional assistants:

In a preferred embodiment of the present invention, pigment print pastes according to the invention furthermore comprise hand improvers, selected from silicones, in particular polydimethylsiloxanes, and C1-C10-alkyl esters of fatty acids. Examples of commercially available hand improvers which may be added to the novel pigment print pastes are Acramin® Softener SI (Bayer AG), Luprimol SIG®, Luprimol TX 4732 and Luprimol CW® (BASF Aktiengesellschaft).

In a preferred embodiment of the present invention, novel pigment print pastes comprise, as further additives, one or more emulsifiers. Examples of suitable emulsifiers are aryl- or alkyl-substituted polyglycol ethers. Commercially available examples of suitable emulsifiers are Emulgator W® (Bayer), Luprintol PE New® and Luprintol MP® (BASF Aktiengesellschaft).

For the preparation of novel pigment print pastes, for example, water, if required an antifoam, for example a silicone-based antifoam, can be stirred, and at least one binder can be added with mixing, for example with stirring. One or more emulsifiers and the pigment or pigments can then be added.

Next, one or more handle improvers may be added, for example one or more silicone emulsions.

Thereafter, at least one novel aqueous dispersion is added and homogenization is effected with further mixing, for example stirring.

A typical novel pigment print paste comprises, in each case per kilogram of novel pigment print paste, from 5 to 400 g, preferably from 10 to 250 g, of binder, for example acrylate binder, from 0 to 100 g, preferably from 1 to 5 g, of emulsifier, from 1 to 500 g, preferably from 3 to 100 g, of the novel aqueous dispersions, from 0 to 500 g, preferably from 0.1 to 250 g, preferably from 0.5 to 120 g of pigment, if required, further assistants;

the remainder preferably being water.

In an embodiment of the present invention, novel pigment print pastes have a viscosity of from 0.3 to 4000, preferably from 20 to 200, particularly preferably from 60 to 100, dPa·s at 20° C. Viscosities can be determined by conventional methods, in particular, for example, using a rotational viscometer, for example the Viscotester VT02 or VT24 from Haake Mess-Technik GmbH u. Co., Karlsruhe.

Pigment printing with the use of at least one novel pigment print paste can be carried out by various methods which are known per se. It is usual to use a template through which the novel pigment print paste is pressed by means of a knife coater. This method is a screenprinting method. Pigment printing methods with the use of at least one novel pigment print paste give printed substrates having excellent handle of the printed substrates. The present invention therefore relates to flexible substrates and in particular textiles printed by the printing process using at least one novel pigment print paste.

For carrying out the pigment printing process, textile is preferably brought into contact with at least one novel pigment print paste and the latter is subsequently dried thereon.

Particularly preferably, substrate treated according to the invention is predried, for example to a residual moisture content of from 0.5 to 2% by weight, before the actual drying.

The predrying or drying can be carried out on conventional apparatuses. For example, if it is desired to treat textile substrates, it can be carried out on all fixing and drying units customary in the textile industry. Suitable drying and predrying temperatures are, for example, from 50 to 300° C., preferably from 70 to 180° C.

Thermal treatment can then be effected over a period of, for example from 10 seconds to 60 minutes, preferably from 0.5 minute to 7 minutes, at from 50 to 300° C., preferably from 100 to 160° C., particularly preferably from 110 to 130° C. Polyamide, polyester, polyvinyl chloride, modified polyesters, polyester blended fabric, polyamide blended fabric, polyacrylonitrile and polycarbonate are thermally treated advantageously at from 130 to 250° C. Polypropylene fabric is preferably thermally treated at from 80 to 130° C., preferably from 110 to 130° C. Here, the temperature is generally to be understood as meaning the temperature of the medium which surrounds the flexible substrate to be treated.

The K values of the polymers were determined according to H. Fikentscher, Cellulose-Chemie, Volume 13, 58-64 and 71-74 (1932) in 5% strength aqueous sodium chloride solution at 25° C., at a concentration of 0.1% by weight and at a pH of 7.

The viscosity of the dispersions was measured in each case in a Brookfield viscometer using a spindle No. 4 at 20 rpm and at 20° C. Unless stated otherwise, the data in % are by weight.

EXAMPLES

The water-soluble polymers used according to the invention in the examples have the following composition:

Stabilizer 1: Graft polymer of vinyl acetate and polyethylene glycol, having a molecular weight $M_w$ of 6000, polymer concentration 20%

Stabilizer 2: Hydrolyzed copolymer of vinyl methyl ether and maleic acid in the form of the free carboxyl groups, polymer concentration 35%

Stabilizer 3: Copolymer of methyl polyethylene glycol methacrylate and methacrylic acid, having a molar mass $M_w$ of 1500, polymer concentration 40%

Stabilizer 4: Polypropylene glycol having a molecular weight $M_n$ of 600

Stabilizer 5: Polypropylene glycol having a molecular weight $M_n$ of 900

Stabilizer 6: Polypropylene glycol blocked at one terminal group with a methyl group and having a molecular weight $M_n$ of 1000

Stabilizer 7: Block copolymer of polyalkylene glycols having a molecular weight $M_n$ of 1000

Stabilizer 8: Maltodextrin (C-PUR01910, 100% strength)

Stabilizer 9: Polypropylene glycol terminated at one terminal group with a methyl group and having a molecular weight $M_n$ of 2000

In the examples, the following polymerization initiators were used:

Azo initiator VA-044: 2,2'-Azobis(N,N'-dimethyleneisobutyramidine) dihydrochloride Azo initiator V-70: 2,2'-Azobis(4-methoxy-2,4-dimethylvaleronitrile)

Azo initiator V-65: 2,2'-Azobis(2,4-dimethylvaleronitrile)

Example 1

In a 250 ml four-necked flask equipped with a Teflon stirrer and an apparatus for working under nitrogen,
90.0 g of stabilizer 1,
51.4 g of stabilizer 2 and
28.6 g of demineralized water were initially taken while passing through nitrogen and stirred at a speed of 300 rpm.

30 g of acrylic acid were added dropwise to this solution in the course of from 5 to 10 minutes, the mixture was heated to 50° C., 0.03 g of 2,2'-azobis(N,N'-dimethylene-isobutyramidine) dihydrochloride (azo initiator VA-044) was added and the mixture was polymerized for 5 hours at 50° C. The reaction mixture was then mixed with 0.05 g of azo initiator VA-044 and further polymerized for 1 hour at 60° C. An aqueous dispersion having a solids content of 33% was obtained. It had a pH of 4 and a viscosity of 5950 mPa·s. The polymer had a K value of 120.7. By adding water to the dispersion, a 2% strength aqueous solution which had a viscosity of 2640 mPa·s at a pH of 7 was prepared.

The particle size distribution of the dispersed particles of the polymer dispersion was from 3 to 8 μm.

Example 2

In the apparatus stated in example 1,
90.0 g of stabilizer 1,
51.4 g of stabilizer 2 and
28.6 g of demineralized water were initially taken and stirred at a speed of 300 rpm while passing through nitrogen. A mixture of 30 g of acrylic acid and 0.09 g of triallylamine as a crosslinking agent was added dropwise to this solution in the course of from 5 to 10 minutes and the mixture was heated to 40° C. in the course of from 5 to 10 minutes. Thereafter, 0.03 g of 2,2'-azobis(4-methoxy-2,4-dimethylvaleronitrile) (azo initiator V-70) was added and the mixture was polymerized for 5 hours at 40° C. Thereafter, 0.05 g of azo initiator V-70 was added for further polymerization and the dispersion was heated to 50° C. for one hour. An aqueous dispersion having a viscosity of 2700 mPa·s was obtained. It had a pH of 4. By adding water to the aqueous dispersion, a 2% strength aqueous solution was prepared. It had a viscosity of 39 000 mPa·s at pH 7.

The particle size distribution of the dispersed particles of the polymer dispersion was from 5 to 60 μm.

Example 3

Example 2 was repeated with the exceptions that
12.0 g of stabilizer 4,
51.4 g of stabilizer 2 and 106.6 g of demineralized water were initially taken in the polymerization apparatus and the use of triallylamine was dispensed with. An aqueous emulsion which had a viscosity of 2240 mPa·s at pH 4 was obtained.

Example 4

In the apparatus stated in example 1,
1.5 g of stabilizer 5,
16.5 g of stabilizer 4,
18.0 g of stabilizer 8 and
104.0 g of demineralized water were initially taken, the mixture was stirred continuously at 300 rpm and 30 g of acrylic acid were then added continuously in the course of from 5 to 10 minutes. Thereafter, the pH of the reaction mixture was brought from 4.5 to 3 by adding 30 g of 32% strength hydrochloric acid and the emulsion was heated to 50° C. After addition of 0.03 g of azo initiator VA-044, the emulsion was polymerized for 5 hours at 50° C., after which 0.05 g of azo initiator VA-044 was added and polymerization was continued for a further hour at 50° C. An aqueous dispersion having a viscosity of 208 mPa·s was obtained.

Example 5

Example 1 was repeated with the exceptions that a mixture of
45.0 g of stabilizer 3,
51.4 g of stabilizer 2 and
73.6 g of demineralized water were initially taken in the polymerization apparatus. An aqueous emulsion having a viscosity of 3650 mPa·s was obtained.

The particle size distribution of the dispersed particles of the polymer dispersion was from 3 to 10 µm.

Example 6

In the apparatus stated in example 1,
90.0 g of stabilizer 1,
51.4 g of stabilizer 2 and
28.6 g of demineralized water were initially taken and stirred at a speed of 300 rpm while passing through nitrogen. A mixture of 30 g of acrylic acid and 0.22 g of pentaerythrityl triallyl ether (70% strength) as a crosslinking agent was added dropwise to this solution in the course of from 5 to 10 minutes and the mixture was heated to 40° C. in the course of from 5 to 10 minutes. Thereafter, 0.03 g of azo initiator V-70 was added and the mixture was polymerized for 5 hours at 40° C. Thereafter, 0.05 g of azo initiator VA-044 was added for further polymerization and the dispersion was heated to 50° C. for one hour. An aqueous dispersion having a viscosity of 2900 mPa·s was obtained. By adding water and bringing the pH to 7, a 2% strength aqueous solution which had a viscosity of 10 000 mPa·s was prepared. The particle size distribution of the dispersed particles of the polymer dispersion was from 5 to 70 µm.

Example 7

In a 250 ml four-necked flask equipped with a Teflon stirrer and an apparatus for working under nitrogen,
90.0 g of stabilizer 1,
18.0 g of stabilizer 8 and
62.0 g of demineralized water were initially taken while passing through nitrogen and stirred at a speed of 200 rpm. 30 g of acrylic acid were added dropwise to this solution in the course of from 5 to 10 minutes, the mixture was heated to 50° C., 0.03 g of azo initiator VA-044 was added and the mixture was polymerized for 5 hours at 50° C. The reaction mixture was then mixed with 0.05 g of azo initiator VA-044 and further polymerized for 1 hour at 60° C. An aqueous dispersion having a solids content of 33% was obtained. It had a pH of 2 and a viscosity of 10 500 mPa·s. A 2% strength solution prepared by adding water had a viscosity of 2000 mPa·s at a pH of 7. The particle size distribution of the dispersed particles of the polymer dispersion was from 5 to 40 µm.

Example 8

In the apparatus stated in example 1,
90.0 g of stabilizer 1,
51.4 g of stabilizer 2 and
28.6 g of demineralized water were initially taken and stirred at a speed of 300 rpm while passing through nitrogen. A mixture of 30 g of acrylic acid and 0.09 g of triallylamine as a crosslinking agent was added dropwise to this solution in the course of from 5 to 10 minutes and the emulsion was heated to 50° C. in the course of from 5 to 10 minutes. Thereafter, 0.03 g of azo initiator V-65 was added and the mixture was polymerized for 5 hours at 50° C. Thereafter, 0.05 g of azo initiator VA-044 was added for further polymerization and the dispersion was heated to 60° C. for one hour. An aqueous dispersion having a viscosity of 3700 mPa·s was obtained. It had a pH of 4. By adding water to the aqueous dispersion, a 2% strength aqueous solution was prepared. It had a viscosity of 29 000 mPa·s at pH 7. The particle size distribution of the dispersed particles of the polymer dispersion was from 5 to 30 µm.

Example 9

In the apparatus stated in example 1,
90.0 g of stabilizer 1,
45.7 g of stabilizer 2 and
34.3 g of demineralized water were initially taken and stirred at a speed of 300 rpm while passing through nitrogen. A mixture of 30 g of acrylic acid and 0.09 g of triallylamine as a crosslinking agent was added dropwise to this solution in the course of from 5 to 10 minutes and the mixture was heated to 40° C. in the course of from 5 to 10 minutes. 0.03 g of azo initiator V-70 was added and the mixture was polymerized for 5 hours at 40° C. For further polymerization, 0.05 g of azo initiator VA-044 was added and the dispersion was heated to 50° C. for one hour. An aqueous dispersion having a viscosity of 2300 mPa·s was obtained. By adding water and bringing the pH to 7, a 2% strength aqueous solution which had a viscosity of 32 000 mPa·s was prepared.

Example 10

In the apparatus stated in example 1,
18.0 g of stabilizer 9,
18.0 g of stabilizer 8 and
90.0 g of demineralized water were initially taken, the mixture was stirred continuously at 300 rpm while passing through nitrogen and 30 g of acrylic acid were added continuously in the course of from 5 to 10 minutes. The pH of the reaction mixture was then brought from 4.5 to 3 by adding 30 g of 32% strength hydrochloric acid and the emulsion was heated to 50° C. After addition of 0.03 g of azo initiator VA-044, the emulsion was polymerized for 5 hours at 50° C., after which 0.05 g of azo initiator VA-044 was added and polymerization was continued for a further hour at 50° C. An aqueous dispersion having a viscosity of 320 mPa·s was obtained.

Example 11

In the apparatus stated in example 1,
63.0 g of stabilizer 7,
9.0 g of stabilizer 8,
400 g of water and
45 g of acrylic acid were initially taken and was stirred at a speed of 100 rpm while passing through nitrogen. 0.45 g of sodium persulfate and 14.4 g of water were added to this solution and initial polymerization was effected for 15 minutes at 25° C. 135 g of acrylic acid and 27 g of stabilizer 8 were then added in the course of 2 hours at 25° C. At the same time, 0.18 g of ascorbic acid was added in the course of 7 hours. Supplementary polymerization was then effected for one hour. An aqueous dispersion having a viscosity of 800 mPa·s and a pH of 1.5 was obtained. By adding water and sodium hydroxide solution, a 2% strength dispersion having a pH of 7 was prepared. The viscosity of the dispersion was 5000 mPa·s.

Example 12

In a 2 l four-necked flask equipped with a stirrer and an apparatus for working under nitrogen,
257.0 g of stabilizer 1,
449.0 g of stabilizer 2, and
102.5 g of demineralized water were initially taken while passing through nitrogen and stirred at a speed of 200 rpm for 10 minutes. 60 g of acrylic acid were added dropwise to this solution in the course of 10 minutes, the reaction mixture was heated to 60° C., a solution of 90 g of acrylic acid and 1.5 g of ethoxylated trimethylenepropane triacrylate was added in the course of 3.5 hours and, starting at the same time, a solution of 0.15 g of azo initiator VA-044 in 40 g of water was added, the latter solution being added in the course of 4 hours. After the end of the feed, stirring was effected for a further half hour at 60° C. Polymerization was then continued for one hour at 60° C. by adding 0.225 g of azo initiator VA-044. After cooling to room temperature, an aqueous dispersion having a polymer content of 15% by weight, a viscosity of 5350 mPa·s and a pH of 4.5 was obtained. By adding water and sodium hydroxide solution, a 2% strength dispersion having a pH of 7 was prepared. The viscosity of this dispersion was 10 900 mPa·s.

Example 13

In the apparatus stated in example 12,
257.0 g of stabilizer 1,
449.0 g of stabilizer 2, and
102.5 g of demineralized water were initially taken and stirred at a speed of 200 rpm for 10 minutes. 60 g of acrylic acid and 0.015 g of azo initiator VA-044 were added dropwise in the course of 10 minutes to this solution, the reaction mixture was heated to 60° C., a solution of 90 g of acrylic acid and 1.5 g of ethoxylated trimethylenepropane triacrylate was added in the course of 3.5 hours and, starting at the same time, a solution of 0.135 g of azo initiator VA-044 in 40 g of water was added, the latter solution being added in the course of 4 hours. After the end of the feed, stirring was effected for a further half hour at 60° C. Polymerization was then continued for one hour at 60° C. by adding 0.225 g of azo initiator VA-044. After cooling to room temperature, an aqueous dispersion having a polymer content of 15% by weight, a viscosity of 5550 mPa·s and a pH of 4.5 was obtained. By adding water and sodium hydroxide solution, a 2% strength dispersion having a pH of 7 was prepared. The viscosity of this dispersion was 10 300 mPa·s.

Example 14

In the apparatus stated in example 12,
257.0 g of stabilizer 1,
449.0 g of stabilizer 2, and
102.5 g of demineralized water were initially taken and stirred at a speed of 200 rpm for 10 minutes. 60 g of acrylic acid and 0.015 g of azo initiator VA-044 were added dropwise in the course of 10 minutes to this solution, the reaction mixture was heated to 60° C., a solution of 90 g of acrylic acid and 1.5 g of triallylamine was added in the course of 3.5 hours and, starting at the same time, a solution of 0.135 g of azo initiator VA-044 in 40 g of water was added, the latter solution being added in the course of 4 hours. After the end of the feed, stirring was effected for a further half hour at 60° C. Polymerization was then continued for one hour at 60° C. by adding 0.225 g of azo initiator VA-044. After cooling to room temperature, an aqueous dispersion having a polymer content of 15% by weight, a viscosity of 10 250 mPa·s and a pH of 4.5 was obtained. By adding water and sodium hydroxide solution, a 2% strength dispersion having a pH of 7 was prepared. The viscosity of this dispersion was 28 500 mPa·s.

Example 15

In the apparatus stated in example 12,
257.0 g of stabilizer 1,
449.0 g of stabilizer 2, and
102.5 g of demineralized water were initially taken and stirred at a speed of 200 rpm for 10 minutes. 60 g of acrylic acid and 0.015 g of azo initiator VA-044 were added dropwise in the course of 10 minutes to this solution, the reaction mixture was heated to 60° C., a solution of 75 g of acrylic acid, 15 g of methyl methacrylate and 1.5 g of triallylamine was added in the course of 3.5 hours and, starting at the same time, a solution of 0.135 g of azo initiator VA-044 in 40 g of water was added, the latter solution being added in the course of 4 hours. After the end of the feed, stirring was effected for a further half hour at 60° C. Polymerization was then continued for one hour at 60° C. by adding 0.225 g of azo initiator VA-044. After cooling to room temperature, an aqueous dispersion having a polymer content of 15% by weight, a viscosity of 5800 mPa·s and a pH of 4.5 was obtained. By adding water and sodium hydroxide solution, a 2% strength dispersion having a pH of 7 was prepared. The viscosity of this dispersion was 17 500 mPa·s.

Example 16

In the apparatus stated in example 12,
257.0 g of stabilizer 1,
449.0 g of stabilizer 2, and
102.5 g of demineralized water were initially taken and stirred at a speed of 200 rpm for 10 minutes. 60 g of acrylic acid and 0.015 g of azo initiator VA-044 were added dropwise in the course of 10 minutes to this solution, the reaction mixture was heated to 60° C., a solution of 82.5 g of acrylic acid, 7.5 g of methyl acrylate and 1.5 g of triallylamine was added in the course of 3.5 hours and, starting at the same time, a solution of 0.135 g of azo initiator VA-044 in 40 g of water was added, the latter solution being added in the course of 4 hours. After the end of the feed, stirring was effected for a further half hour at 60° C. Polymerization was then continued for one hour at 60° C. by adding 0.225 g of azo initiator VA-044.

After cooling to room temperature, an aqueous dispersion having a polymer content of 15% by weight, a viscosity of 21 900 mPa·s and a pH of 4.5 was obtained. By adding water and sodium hydroxide solution, a 2% strength dispersion having a pH of 7 was prepared. The viscosity of this dispersion was 23 650 mPa·s.

Use Examples as Thickeners

Examples 17-20

Demineralized water was initially taken in a separate beaker in each case and then the aqueous dispersion according to example 12 (active ingredient content 15%), as a thickener, and a base were added in different sequences. The exact sequence is shown in table 1. The pH of the formulations was 10. The viscosity of the formulation was then determined using a Brookfield viscometer DV-II (100 rpm, 20° C.).

TABLE 1

| Example | Formulation - composition in the sequence of addition | Viscosity [mPa·s] |
|---|---|---|
| 17 | 96.4% of water<br>3.3% of dispersion according to example 12<br>0.3% of NaOH (100%) | 684 (spindle 3) |
| 18 | 96.4% of water<br>0.3% of NaOH (100%)<br>3.3% of dispersion according to example 12 | 676 (spindle 3) |
| 19 | 62.6% of water<br>3.3% of dispersion according to example 12<br>34.1% of triethanolamine (100%) | 1650 (spindle 4) |
| 20 | 62.6% of water<br>34.1% of triethanolamine (100%)<br>3.3% of dispersion according to example 12 | 1680 (spindle 4) |

We claim:

1. An aqueous dispersion of water-soluble polymers obtained by free radical polymerization of ethylenically unsaturated anionic monomers in an aqueous medium in the presence of a stabilizer, wherein the stabilizer comprises:
   (a) at least one water-soluble polymer selected from the group consisting of a graft polymer of vinyl acetate and/or vinyl propionate on polyethylene glycol, a polyethylene glycol blocked at one or both terminal groups with an alkyl, a carboxyl or an amino group, and a copolymer of alkyl polyalkylene glycol methacrylate and methacrylic acid;
   and
   (b) at least one water-soluble polymer selected from the group consisting of a hydrolyzed copolymer of vinyl alkyl ether and maleic anhydride in the form of free carboxyl groups or in the form of salts at least partly neutralized with one or more alkali metal hydroxides or one or more ammonium bases, a cationically modified potato starch, an anionically modified potato starch, a degraded potato starch and maltodextrin.

2. The aqueous dispersion according to claim 1, wherein a polyalkylene glycol having a molar mass Mn of from 100 to 100000, and a polyalkylene glycol blocked at one or both terminal groups with an alkyl, a carboxyl or an amino group and having a molar mass Mn of from 100 to 100000, are used as the at least one water-soluble polymer of (a).

3. The aqueous dispersion according to claim 1, wherein the hydrolyzed copolymer of vinyl alkyl ether and maleic anhydride in the form of free carboxyl groups or in the form of salts at least partly neutralized with one or more alkali metal hydroxides or one or more ammonium bases, and/or maltodextrin, are used as the at least one water-soluble polymer of (b).

4. The aqueous dispersion according to claim 1, wherein a hydrolyzed copolymer of vinyl methyl ether and maleic anhydride in the form of free carboxyl groups or in the form of salts at least partly neutralized with sodium hydroxide solution, potassium hydroxide solution or ammonia, are used as the at least one water-soluble polymer of (b).

5. The aqueous dispersion according to claim 1, wherein the stabilizer comprises:
   (a) a graft polymer of vinyl acetate on polyethylene glycol and having a molecular weight $M_n$ of from 1000 to 100000;
   and
   (b) a hydrolyzed copolymer of vinyl methyl ether and maleic anhydride in the form of free carboxyl groups and or in the form of salts at least partly neutralized with sodium hydroxide solution, potassium hydroxide solution or ammonia.

6. The aqueous dispersion according to claim 1, wherein the stabilizer comprises:
   (a) one or more copolymers of alkyl polyalkylene glycol methacrylate and methacrylic acid;
   and
   (b) at least one hydrolyzed copolymer of vinyl methyl ether and maleic anhydride in the form of free carboxyl groups or in the form of salts at least partly neutralized with sodium hydroxide solution, potassium hydroxide solution or ammonia.

7. The aqueous dispersion according to claim 1, wherein monoethylenically unsaturated $C_3$- to $C_5$-carboxylic acids, vinylsulfonic acid, styrenesulfonic acid, acrylamidomethylpropanesulfonic acid, vinylphosphonic acid and/or the alkali metal or ammonium salts thereof are used as the ethylenically unsaturated anionic monomers.

8. The aqueous dispersion according to claim 1, wherein the polymerization of the ethylenically unsaturated anionic monomers is carried out in the presence of other ethylenically unsaturated monomers.

9. The aqueous dispersion according to claim 8, wherein the polymerization of the ethylenically unsaturated anionic monomers is carried out in the presence of at least one other monomer selected from the group consisting of acrylamide, methacrylamide, an acrylic ester of monohydric alcohols of 1 to 4 carbon atoms, a methacrylic ester of monohydric alcohols of 1 or 2 carbon atoms, vinyl acetate, vinyl propionate, dialkylaminoethyl(meth)acrylate, dialkylaminopropyl(meth)acrylate, diallyldimethylammonium chloride, vinylimidazole, and quaternized vinylimidazole.

10. The aqueous dispersion according to claim 1, wherein acrylic acid is used as the ethylenically unsaturated anionic monomers and the free radical polymerization is carried out in the presence of the stabilizer but in the absence of other monomers.

11. The aqueous dispersion according to claim 1, wherein the free radical polymerization is additionally carried out in the presence of at least one crosslinking agent.

12. The aqueous dispersion according to claim 11, wherein the at least one crosslinking agent is at least one selected from the group consisting of triallylamine, pentaerythrityl triallyl ether, methylenebisacrylamide, N,N'-divinylethyleneurea, a dihydric alcohol of 2 to 4 carbon atoms which is completely esterified with acrylic acid or methacrylic acid, ethoxylated trimethylolpropane triacrylate, ethoxylated trimethylolpropane trimethacrylate, pentaerythrityl triacrylate, pentaerythrityl tetraacrylate, and triallylmethylammonium chloride.

13. A process for the preparation of an aqueous dispersion of water-soluble polymers comprising:
free radical polymerizing ethylenically unsaturated anionic monomers in an aqueous medium in the presence of a stabilizer, wherein the free radical polymerization is carried out at a pH of from 1 to 13 and the stabilizer comprises:
(a) at least one water-soluble polymer selected from the group consisting of a graft polymer of vinyl acetate and/or vinyl propionate on polyethylene glycol, a polyethylene glycol blocked at one or both terminal groups with an alkyl, a carboxyl or an amino group, and a copolymer of alkyl polyalkylene glycol methacrylate and methacrylic acid,
and
(b) at least one water-soluble polymer selected from the group consisting of a hydrolyzed copolymer of vinyl alkyl ether and maleic anhydride in the form of free carboxyl groups or in the form of salts at least partly neutralized with one or more alkali metal hydroxides or one or more ammonium bases, and maltodextrin.

14. A method for thickening an aqueous system, the method comprising:
adding the aqueous dispersion according to claim 1 to the aqueous system.

15. The method according to claim 14, wherein the aqueous dispersion is used as an additive to paper coating slips, as thickeners for pigment print pastes and for water-based surface coatings, as thickeners for cosmetic formulations and for the surface treatment of leather.

* * * * *